(No Model.)
E. LUHMANN.
PROCESS OF MAKING CARBON DIOXIDE.
No. 507,741. Patented Oct. 31, 1893.
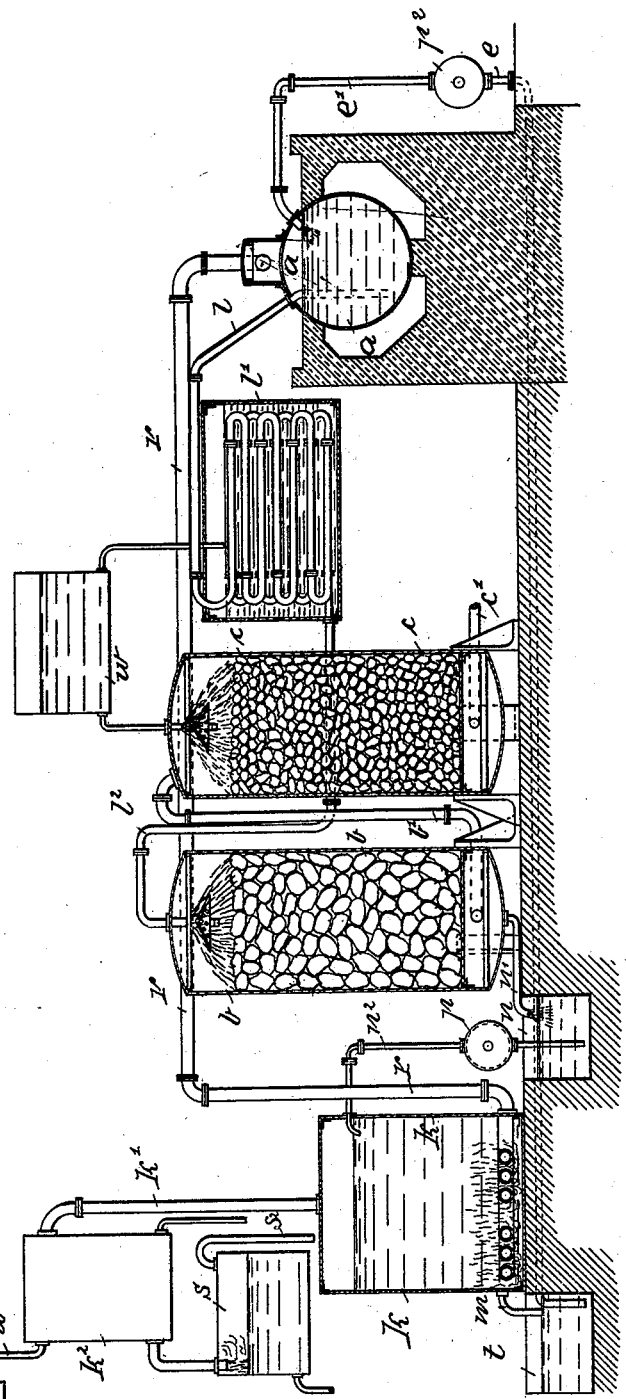
Witnesses:
Inventor:
Eduard Luhmann
by Robert Dibler
Attorney

UNITED STATES PATENT OFFICE.

EDUARD LUHMANN, OF ANDERNACH, GERMANY.

PROCESS OF MAKING CARBON DIOXIDE.

SPECIFICATION forming part of Letters Patent No. 507,741, dated October 31, 1893.

Application filed July 11, 1891. Serial No. 399,250. (No specimens.)

*To all whom it may concern:*

Be it known that I, EDUARD LUHMANN, a subject of the King of Prussia, German Emperor, and a resident of Andernach, in the Province of the Rhine, Kingdom of Prussia, Empire of Germany, have invented certain new and useful Improvements in Processes of Extraction of Gases from Fluids, of which the following is a full, clear, and exact specification, reference being had to the accompanying drawing, which forms a part of this specification.

My invention relates to a method of extracting gases from fluids in a continuous way by decomposing and regenerating the latter, and consists in effecting the decomposition in two stages, extracting the main portion of the gases at a pressure but very little exceeding the atmospheric pressure, and the remaining portion at a pressure of from one and a half to two atmospheres.

In order to perform my process I employ an apparatus of the kind illustrated by the accompanying drawing, which is a longitudinal sectional elevation of the said appartus.

The closed boiler $a$ is placed within a furnace of any suitable construction. In the upper part of the boiler shell the pipe $l$ is passed through a suitable hole in the same, and reaches down nearly to the bottom of the said boiler. The pipe $l$ leads into a cooling tank $l'$, in which it forms a coil, and leaves the same by means of the pipe $l^2$, which is connected with the absorption tower $b$, and provided at its extremity, in the upper part of the said tower $b$, with a rose of any appropriate construction. This absorption tower $b$ is filled in its greater part with fragments of coal or of any other material presenting a large surface, said material resting on a perforated plate provided a short distance above the bottom of the absorption tower $b$. A pipe $n'$ leads from the bottom of the latter to the collecting vessel or tank $n$. Immediately below the above mentioned perforated plate on which the fragments of coal rest, I provide another pipe $b'$ which communicates with the top of the washing cylinder $c$, which is constructed similar to the absorption tower $b$. This cylinder is filled with fragments of marble resting on a perforated plate, below which there is provided a pipe $c'$. Above the washing cylinder $c$ I place a reservoir $w$, from the lower part of which one pipe leads into the washing cylinder $c$, where it ends in a rose, and another pipe into the cooling tank $l'$. Both the absorption tower $b$ and washing cylinder $c$ are hermetically closed. Above the collecting tank $n$ there is provided a forcing pump $p$, from which a pipe descends into said tank $n$, while another pipe $n^2$ leads from the pump $p$ into the upper part of a boiling vat $k$. In the lower part of the latter I arrange several perforated tubes, which are all in communication with the pipe $r$ coming from the dome at the top of boiler $a$. At the top of the boiling vat $k$ I provide a pipe $k'$ communicating with a cooler $k^2$, which is supplied with water from a reservoir $w'$ by means of a pipe $w^2$. The pipe on the right at the bottom of cooler $k^2$ is for draining off the water by opening a suitable cock (not shown on the drawing), and the pipe leaving said cooler at the bottom on the left leads into the collecting vessel $s$. From the top of the latter a pipe $s^2$ leads to the gasometer, not shown on the drawing, while the pipe at the bottom of said collecting vessel leads into the tank $t$. Into the latter are also led the pipes $m$ and $e$, the former from the lower part of boiling vat $k$, and the latter communicating with a forcing pump $p^2$, from which a pipe $e'$ leads into the boiler $a$.

I will now describe my improved process as applied to the production of carbonic acid from bicarbonate of soda.

The boiling vat $k$ is filled with a bicarbonate of soda solution of 10° Baumé, the reservoirs $w$ and $w'$ and coolers $k^2$ and $l'$ being filled with water. Boiler $a$ is likewise partly filled with water or with a weak lye of carbonate of soda. This solution is heated till it boils thoroughly and the steam evolved escapes through the pipe $r$ into the boiling vat $k$. The liquid itself—I will assume that a weak lye is employed—rises in pipe $l$ and flows through the serpentine coil placed in the cooler $l'$, where it is brought to the temperature which will enable it to absorb the maximum amount of carbonic acid. Hereafter the lye proceeds through the connecting pipe $l^2$ to the absorption tower $b$ and issues in the top of the same through the rose provided at the end of the pipe. At the same time carbonic acid produced in any usual manner enters the washing cylinder $c$ at the lower part of the same by the pipe $c'$. The fragments of marble with which this cylinder is filled are continuously kept moist by a fine shower of water coming from the reservoir $w$. The carbonic acid rising in the washing cylinder $c$ is thus freed of any impurities which may be admixed with it and then enters the absorption tower $b$ at the bottom by the pipe $b'$ and moves in this tower in the opposite direction to the lye, which travels downward. In consequence thereof, the lye may absorb a great quantity of carbonic acid and is thus converted into a solution of bicarbonate or at least sesquicarbonate of soda. This liquid leaves the absorption tower by the pipe $n'$ and flows into the collecting vessels or tank $n$, whence it is conveyed into the boiling vat $k$ by means of the pump $p$ and through the pipe $n^2$. The boiling vat $k$ is heated by means of the steam emanating from the boiler $a$ and entering the same through the perforated pipes located at the bottom. The steam then heats and decomposes the lye to such an extent that it gives off most of the carbonic acid which it contains which becomes mixed with that carried away with the steam from boiler $a$. The carbonic acid which is thus freed passes through pipe $k'$ into the cooler $k^2$ supplied with water from reservoir $w'$, and thence into the collecting vessel $s$, where the condensed water is collected, while the carbonic acid is conducted by means of pipe $s^2$ to the gasometer. The water proceeding from condensation in vessel $s$ is allowed to run into tank $t$ so as to maintain a uniform concentration of the lye. This is absolutely necessary, as otherwise the lye would become so dense, as to be unable to retain the salt in solution, but would throw it off and clog the pipes. The hot lye coming from the boiling vat $k$ which runs out of same into the vessel $t$ through the pipe $m$ is not yet freed of all the bicarbonate or sesquicarbonate of soda which it holds in solution. It is still to a certain extent undecomposed and would not only, if used again in that state, hamper the production of carbonic gas to a great extent, but it would be very difficult to regenerate this impure residue lye into bicarbonate or sesquicarbonate of soda, that is to say, that the small absorbent power of this impure lye would greatly impede the further processes. To avoid this the impure lye is taken up by the pump $p^2$ by means of pipes $e\ e'$ and pumped into boiler $a$.

It will be understood that the process is a continuous one, and therefore may be kept up for any length of time, but it is preferable for practical reasons that the boiling should be continued for one hour at least. The chief advantage of the described process is that it permits of a complete and thorough utilization of the heat generated, while facilitating the processes throughout.

The same process may be employed for producing carbonic acid from bicarbonate of potash, and the most advantageous strength of the solution will be 17° Baumé.

Having thus fully described the nature of this invention, what I desire to secure by Letters Patent of the United States is—

The method of producing carbonic acid from liquors containing sesqui or bicarbonate, said method consisting in first heating the liquor in a boiling vat at low pressure, thereby expelling the main part of the carbonic acid, then boiling the liquor or lye under high pressure in a closed boiler and thereby simultaneously concentrating the lye; the steam and the carbonic acid evolved being used for heating the lye in the boiling vat, substantially as described.

In testimony whereof I have signed this specification in the presence of two subscribing witnesses.

EDUARD LUHMANN.

Witnesses:
 OTTO BRAEGER,
 WILLIAM OELRICHS.